United States Patent [19]
Li et al.

[11] Patent Number: 5,093,158
[45] Date of Patent: Mar. 3, 1992

[54] METHOD TO MAKE FIBER/POLYMER COMPOSITE WITH NONUNIFORMLY DISTRIBUTED POLYMER MATRIX

[75] Inventors: Hsin L. Li, Parsippany; Gary A. Harpell; Dusan C. Prevorsek, both of Morristown, all of N.J.

[73] Assignee: Allied-Signal Inc., Morris Township, Morris County, N.J.

[21] Appl. No.: 276,739

[22] Filed: Nov. 28, 1988

[51] Int. Cl.$^5$ .......................... B05D 3/12; B05D 5/00
[52] U.S. Cl. .................................. 427/278; 427/264; 427/288
[58] Field of Search ............... 427/278, 276, 288, 277, 427/264; 428/198, 294, 295

[56] References Cited

U.S. PATENT DOCUMENTS

| | | | |
|---|---|---|---|
| 2,039,312 | 5/1936 | Goldman | 428/113 |
| 2,593,207 | 4/1952 | Silver | 427/278 X |
| 2,705,687 | 4/1955 | Petterson et al. | 428/198 |
| 4,088,726 | 5/1978 | Cumbers | 427/278 X |
| 4,240,857 | 12/1980 | Dell Vecchia et al. | 156/209 |
| 4,269,884 | 5/1981 | Dell Vecchia et al. | 428/131 |
| 4,403,012 | 9/1983 | Harpell et al. | 428/290 |
| 4,413,110 | 11/1983 | Kavesh et al. | 526/348.1 |
| 4,457,985 | 7/1984 | Harpell et al. | 428/224 |
| 4,501,856 | 2/1985 | Harpell et al. | 525/240 |
| 4,543,286 | 9/1985 | Harpell et al. | 428/288 |
| 4,584,347 | 4/1986 | Harpell et al. | 525/119 |
| 4,612,238 | 9/1986 | Della Vecchia et al. | 428/228 |
| 4,623,574 | 11/1986 | Harpell et al. | 428/113 |
| 4,650,710 | 3/1987 | Harpell et al. | 428/263 |
| 4,681,792 | 7/1987 | Harpell et al. | 428/102 |
| 4,737,401 | 4/1988 | Harpell et al. | 428/252 |
| 4,737,402 | 4/1988 | Harpell et al. | 428/252 |

Primary Examiner—Evan Lawrence
Attorney, Agent, or Firm—Patrick L. Henry

[57] ABSTRACT

A method of making a composite of a unidirectional fibrous web in a polymer matrix composition by nonuniformly feeding a polymer composition into contact with a unidirectional fibrous web into a gap between two adjacent compression surfaces with at least one of the surfaces having a pattern. This results in the polymer becoming nonuniformly distributed into thick areas and thin areas as a matrix for the fibrous web.

10 Claims, 4 Drawing Sheets

METHOD TO MAKE FIBER/POLYMER COMPOSITE WITH NONUNIFORMLY DISTRIBUTED POLYMER MATRIX

BACKGROUND OF THE INVENTION

Ballistic article such as bulletproof vests, helmets, armor plate and other military equipment, structural members of helicopters, aircraft, ships, and vehicle panels and briefcases containing high strength fibers are known. Fibers conventionally used include aramid fibers, fibers such as poly(phenylenediamine terephthalamide), graphite fibers, ceramic fibers, nylon fibers, glass fibers and the like. For these applications, the fibers are ordinarily encapsulated or embedded in a rigid matrix material and, in some instances, are joined with rigid facing layers to form complex composite structures.

U.S. Pat. Nos. 4,403,012: 4,457,985 4,501,856: 4,543,286 4,623,574: 4,650,710 disclose ballistic resistant composite article comprised of networks of high strength fibers in matrices composed of olefin polymers and copolymers, unsaturated polyester resins, epoxy resins, and other resins curable below the melting point of the fiber. While such composites provide effective ballistic resistance, A. L. Lastnik, et al. "The Effect of Resin Concentration and Laminating Pressures on Kevlar Fabric Bonded with Modified Phenolic Resin", Technical Report NATICK/TR-84/030, June 8, 1984, have disclosed that an interstitial resin, which encapsulates and bonds the fibers of a fabric, reduces the ballistic resistance of the resultant composite article. Therefore, a need exists to improve the structure of composites to effectively utilize the properties of the high strength fibers.

U.S. Pat. No. 4,623,514, Harpell et al., filed Jan. 14, 1985, and commonly assigned, discloses a simple composites..comprising high strength fibers embedded in an elastomeric matrix. Surprisingly, the simple composite structure exhibits outstanding ballistic protection as compared to simple composite utilizing rigid matrices, the results of which are disclosed therein. Particularly effective are simple composites employing ultra-high molecular weight polyethylene and polypropylene such as disclosed in U.S. Pat. No. 4,413,110.

A limitation of the composites disclosed in the art is that the percentage of resin is at least 10 volume percent. U.S. Pat. No. 4,650,710 discloses that the fiber network comprises at least 50 volume percent of the fabric layer, more preferably at least about 70 volume percent, and most preferably at least about 90 volume percent. This patent notes that the volume percent of elastomer in a fabric layer is preferably less than 15 volume percent, more preferably less than about 10 volume percent, and most preferably less than about 5 volume percent. It is desirable to maintain as high a volume percent of fabric as possible to enhance ballistic resistance.

However, patents such as U.S. Pat. No. 4,623,574 show the difficulty in preparing a composite made of a fabric web within a polymeric matrix. In Table 6, sample 12, when a high amount of fiber was used the sample lacked consolidation and could not be tested.

As armor has progressed so has ballistic technology. Presently, armor is desirable to protect against flechettes. Flechettes are sharpened nail-like projectiles having a sharp end and fins at the end opposite the sharp end. They are essentially metal darts. They are metallic, about 0.15 to 1.5 inches long. It is desirable to develop composites useful as armor which can resist the penetration of sharp projectiles such as flechettes.

SUMMARY OF THE INVENTION

The present invention is a method of making a composite from a fibrous web and a matrix composition, preferably a polymeric composition. The method comprises the step of nonuniformly impregnating a fibrous web with a matrix composition.

A fibrous web is a layer defined by a plurality of fibers. Typically, the layer is thin and defines a surface, with the major plane of the web corresponding to the surface of the web. Preferably, the fibrous web is a tape or layer in which the fibers are unidirectional By unidirectional it is meant that the fibers are parallel to each other within the web. By nonuniformly impregnating the web, it is meant that the polymeric composition is nonuniformly distributed in the major plane of the web in a regular or random pattern.

A specific embodiment of the present invention is a method of making a composite of a fibrous web in a polymeric matrix. The method comprises feeding a polymeric composition into contact with a fibrous web. The composite comprises from 1 to 15, preferably 2 to 10 volume percent of the polymeric composition and a corresponding volume precent of the fibrous web. In the composite, the polymeric composition is nonuniformly distributed as a matrix for the fibrous web. Alternately, the fibrous web is nonuniformly impregnated or coated with the polymeric composition.

In a specific and preferred embodiment of the method of the present invention, the step of nonuniformly distributing the polymeric composition comprises feeding the polymeric composition with the fibrous web to the gap between two adjacent compression rolls. At least one of the rolls has a patterned surface The patterned surface can comprise raised surfaces upon at least one roll. At the gap between rolls, the raised surfaces result in a narrower gap between the two adjacent compression rolls. When the raised surfaces are located at the gap, the polymer is forced away from the raised surfaces as the polymer and fibrous web pass through the gap. The resulting composite layer is a fibrous web impregnated with a polymeric material, resulting in localized lower matrix content. The polymeric material is nonuniformly distributed so that there is a patterned surface with portions of the web having greater amounts of polymer than other portions. These portions are thicker areas, having greater resin content, than the areas which have been impressed by the raised surfaces at the narrow gap. The thicker portions have a greater polymer to fiber ratio than areas of the composite which passed through the narrower gap and have a lower polymer to fiber ratio. The total amount of polymer necessary to maintain the integrity of the polymer impregnated web is reduced. It is preferred that the thick areas which provide the integrity of the polymeric layer are a continuous area along the surface of the fibrous/polymeric composite.

The fibrous polymeric composite made by the process of the present invention maintains its integrity yet results in a composite which has a greater volume ratio of fiber to polymer, than a composite made from a fibrous web in a matrix layer having a uniform thickness over the area of the web.

DETAILED DESCRIPTION OF THE INVENTION

The present invention will be understood by those skilled in the art by reference to the accompanying Figures.

The present invention is directed to a method of nonuniformly distributing a matrix material, preferably a polymer composition as a matrix for a fibrous web. The present invention is particularly useful for making composites comprising fibrous webs in a polymeric matrix where there is very high volume percent of fiber compared to the volume percent of the polymer composition. Preferably there is from 2 to 15 and more preferably 2 to 10 and most preferably 2 to 5 volume percent of polymer composition and a corresponding amount of fibrous web. By nonuniformly distributing the polymer matrix, high volumes of fiber can be incorporated and result in a structure which has improved physical integrity during processing and use, such as cutting the composite, and stacking unidirectional prepreg tape. By maintaining its intergrity and ability to be handled, it means that the fibrous polymer composite retains its structure without yarn separation during processing and use. More than one layer of the fibrous web impregnated with resin can be built up to form a multi-layer laminate. This multilayer composite laminate has been found to be resistant to impact, and more specifically resistant to impact by, narrow sharp objects having an average diameter of less than 0.125 inches such as flechettes.

Figure 1:
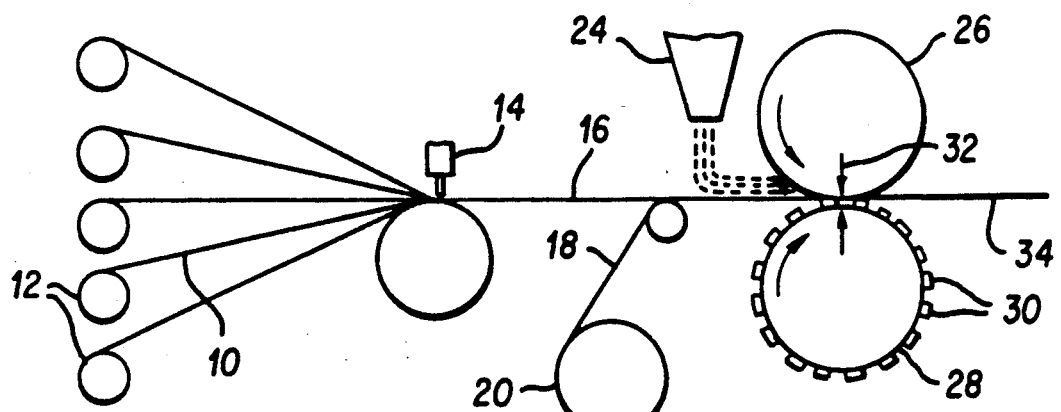
FIG. 1 is a schematic diagram of an equipment layout used to illustrate the method of the present invention.

A specific and preferred embodiment of the present invention is illustrated in FIG. 1. This embodiment is directed to a method of making a composite comprising a fibrous web wherein the fibers are unidirectionally oriented. However, the method of the present invention can be used with any fibrous web such as, knitted or woven fiber.

Fiber (10), such as yarn, is fed from bobbins (12) through a suitable means such as combs to align the fibers (10). Means to align the fiber (14) can be a comb, or series of pegs or rolls used to separate and align the fibers in a desired configuration such as unidirectionally with a given number of yarn ends per inch of web width.

The fibrous web (16) that forms is maintained by suitable constraints to control the number of ends per inch of the fibers. Preferably, a carrier web (18) is used to support the fibrous web (16). The carrier web (18) is provided from a carrier web roll (20) and directed to suitable rolls to support the fibrous web.

Figure 2:
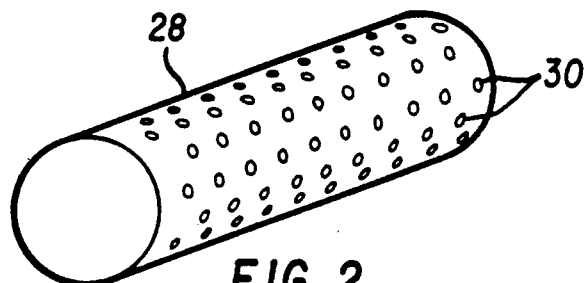
FIG. 2 is an illustration of a roll having a patterned surface which is useful in the method of the present invention.

A polymeric composition (22) is fed from polymer composition feed means (24) onto the fibrous web supported by carrier web (18). The polymer composition (22) fibrous (16) and carrier web (18) are pulled toward compression rolls 26 and 28. At least one of the compression rolls is a patterned compression roll. In FIG. 1 compression roll (28) is a patterned compression roll. Compression roll (28) is shown isometrically in FIG. 2. As the carrier web and fiber web pass through the gap between rolls (26) and (28) polymer composition is impregnated into the fibrous web along the width of the rolls.

The polymeric composition is nonuniformly distributed along the width of the fibrous web. This is accomplished by the patterned surface on at least one of the compression rolls. The patterns are preferably raised areas or protrusions (30) on the surface of the roll (28). This results in the gap between the two compression rolls (26) and (28) varying along the length of the rolls. At locations where there are protrusions the gap is narrower, and at locations where there are no patterns or protrusions the gap is wider. When the carrier web and fibrous web with the polymer, pass through the gap between the compression rolls (26) and (28) the protruding pattern surface results in the narrower gap between the adjacent rolls. This forces the polymer away from the raised surfaces and the polymer passes through the wider gap. This results in a composite layer having thick layers having a greater polymer to fiber ratio and areas of the composite having a lower polymer to fiber ratio.

In a preferred method the pattern compression roll (28) is in contact with carrier web (18). This permits the pattern roll to remain clean and not in contact with the polymer composition (22). Preferably the protruding patterned portion is a discontinuous area while the non-protruding patterned area, or the area which results in the wider gap is a continuous area. In a preferred design the pattern is a plurality of raised or protruding areas (30). In the embodiment shown in FIGS. 1 and 2 and used to prepare the polymer impregnated webs of FIGS. 3 and 4 the protrusions (30) are raised circles.

The protrusions are spaced on the patterned roll in a pattern which preferably is regular pattern but can be random pattern of random shapes. The protrusions occupy from 10 to 90% and preferably 50-90% of the area of at least one roll. The protusions are preferably distributed in a regular distribution. In a preferred embodiment of a roll shown in FIG. 2, the patterned compression roll (28) has raised or protrusions (30). The protrusions are preferably from 0.005 to 0.10 inches high, and preferably 0.010 to 0.050 inches high. The protrusions have an area of at least about 0.03 square inches, preferably from about 0.5 square inches to about 100 square inches, more preferably from about 0.5 square inches to 20 square inches and most preferably from 0.75 square inches to about 10 square inches. The protrusions (30) are preferbly circles having a diameter of 0.2 inches to 4 inches and preferably 0.3 inches to 3 inches and most preferably 0.5 to 1.5 inches. The circles can be made of circles of plastic film adhered to the roll by a suitable adhesive means. The protrusions can be transverse strips in the axial direction on the roll. Where a unidirectional fibric web is used, the strips can be perpendicular to the direction of the fibers.

The gap 32 between rolls can vary depending on the thickness of the fibrous web, the amount of polymeric composition to be impregnated into the fibrous web and the distribution and height of the protrusions (30).

The composites have a high fiber content. There is from 85 to 98 and preferably 90 to 98 and more preferably 95 to 98 volume percent of fiber in the composite. The remainder is a matrix of a polymer composition. Each layer of the composite of the present invention has a distribution of polymer which is in a pattern wherein there are areas of the composite which are thick and have a greater polymer to fiber ratio and areas of the composites which are thinner areas having a lower polymer to fiber ratio. The polymer matrix to fiber ratio in a thick area is preferably from at least 1.5 times greater, more preferably to 2 to 20 and most preferably from 2 to 10 times greater than the polymer to fiber ratio in thin areas.

Figure 3:
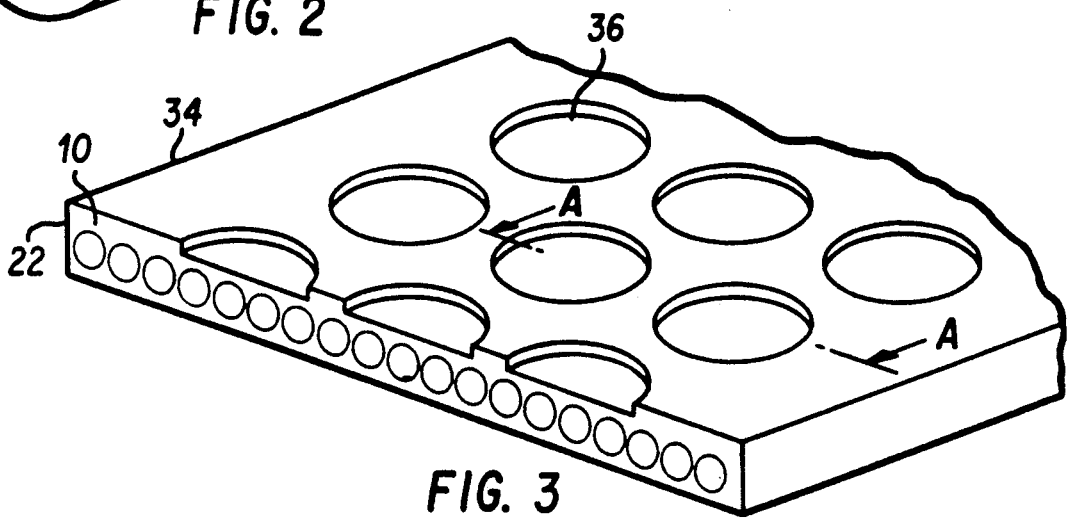
FIG. 3 is an illustration of a preferred fibrous web nonuniformly embedded with a polymer composition.
Figure 4:
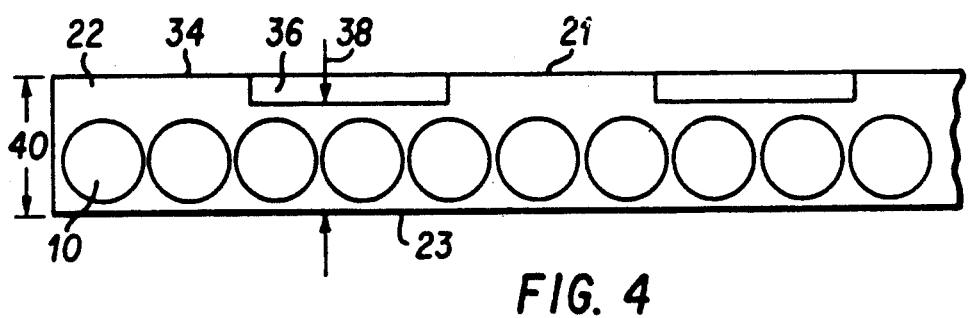
FIG. 4 is a sectional view of a portion of the web in FIG. 1.
Figure 5:
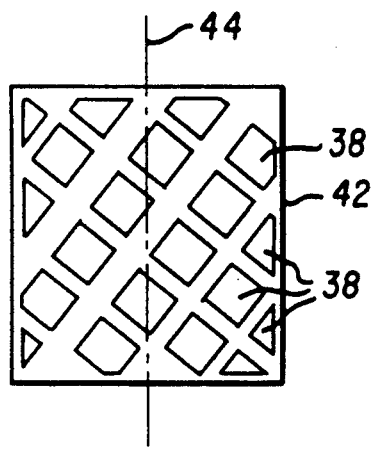
FIGS. 5-8 are schematic diagrams illustrating different shape and pattern distributions useful in the present invention.
Figure 6:
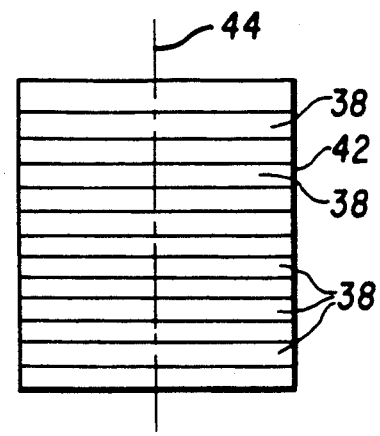
Figure 7:
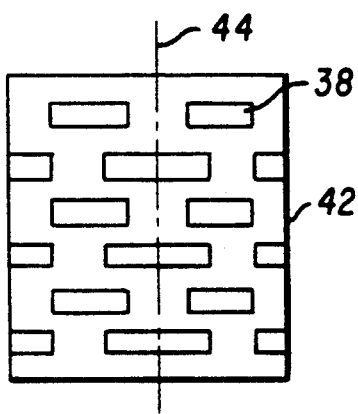
Figure 8:
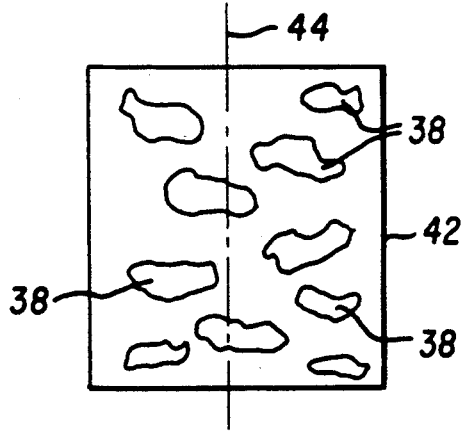

FIGS. 3 and 4 illustrate a composite comprising impregnated fibrous web (34). The fibers (10) are unidirectionally oriented. The fibrous web is within a matrix of polymer composition (22). The polymer composition is not uniformly distributed along the web. Rather, there are thin areas on the surface of the fibrous web which have impressions resulting from the protrusions (30). These areas generally have a shape corresponding to the shape of the protrusion (30). There are thin sections (38) at the location of the impression in the web by the protusion (30) which has a thickness which is thinner than the thick section (40) of the web. The thickness of the thick section (40) at the thick areas of the web is equivalent to the thickness resulting from the gap between the rolls where there are no protrusions. FIG. 4 illustrates a cross sectional area of a portion of impregnated fibrous web (34) illustrating the impressions (36) resulting in a thinner web dimension at the location of the impression compared to the thicker portion of the web (40) located away from the protrusions or impressions. The composite of FIG. 4 has impressions (36) only on one side (21). The second side (23) is flat.

The shape of the protrusion is not crtical. There should be a sufficient amount of matrix composition in the thick section (40) to provide structural integrity and increased strength compared to a composite with the same volume percent matrix and volume percent fiber as a composite having a uniform thickness, with no thin section, over the area of the composite layer. The shape of the areas of thick section (40) are particularly important where composite layers are made of unidirectional (parallel) fibers. The thick section (40) provide improved structural integrity in a direction at an angle, preferably perpendicular to the direction of the fiber.

Alternate shapes of the protrusion (30) can be used to result in a different pattern of thick sections (40) and thin section (38) of the composite layer.

FIGS. 5 through 8 show a variety of alternate patterns useful on a layer of composite which comprises unidirection fiber in the axial direction (42).

Figure 9:
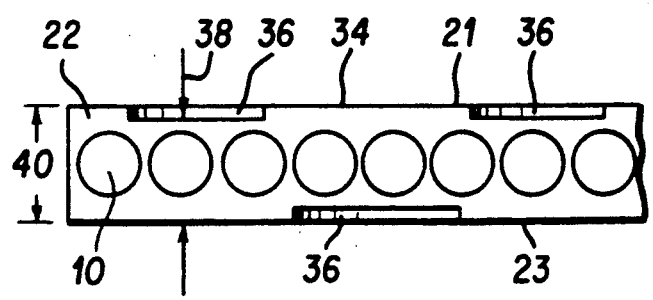
FIG. 9 is a sectional view of an alternate embodiment of the present invention.

FIG. 9 illustrates an alternate composite layer made from an embodiment where both compression rolls (26) and (28) have protrusion (30). Reference characters correspond to those in FIG. 4.

The fibrous web of the present invention maintains thin section (38) and thick section (40) during processing. The area of the protrusion (30) should be large enough so that the impression (38) remains after forming the composite layer, resulting in thin section (38). It has been found that even when less viscous matrix compositions are used thin sections (38) remain.

In alternate embodiments of the present invention, the nonuniform distribution of the matrix composition can be attained by other means. For example the present invention includes laminating a fibrous web with at least one continuous layer of polymeric composition and at least one additional layer which comprises a discontinuous polymer distribution. This could be applied by feeding polymer onto the first layer in a patterned fashion or by using a perforated layer or layer having a pattern wherein there are areas without polymer and areas with polymer, i.e. holes. The layers which comprise the continuous polymeric layer and the discontinuous polymeric layer can be laminated with a fibrous web under heat and pressure to result in nonuniformly impregnated a fibrous web with a matrix composition. This results in an impregnated polymer web which could have from 2 to 15 volume percent resin distributed sufficiently to enable the web to maintain its integrity despite the high volume percent of fiber.

The present invention is useful to make a composite article of manufacture which comprises a network of high strength fibers having a tensile modulus of at least about 160 g/denier and a tenacity of at least about 7 g/denier in a suitable matrix, preferably an elastomeric matrix material. The fiber is tested according to ASTMD 2256 using 4D tire and cord clamps, on an Instron testing machine at an elongation of 100%/minute. Preferably the elastomeric composition has a tensile modulus of less than 20,000 psi, preferably less than 6000 psi measured according to ASTM D638-84 at 25° C.

For the purposes of the present invention, fiber is an elongate body the length dimension of which is much greater than the transverse dimensions of width and thickness. Accordingly, the term fiber includes monofilament fiber, ribbon, strip, and the like having regular or irregular cross-section.

The fibrous web used in the method of the present invention comprises any fibers useful to make composites. A preferred fiber network comprises highly oriented ultra high molecular weight polyethylene fiber, highly oriented ultra high molecular weight polypropylene fiber, aramid fiber, polyvinyl alcohol fiber, polyacrylonitrile fiber, fiberglass, ceramic fibers or combinations thereof. U.S. Pat. No. 4,457,985 generally discloses such oriented ultra high molecular weight polyethylene and polypropylene fibers, the disclosure of which is hereby incorporated by reference to the extent not inconsistent herewith. In the case of polyethylene, suitable fibers are those highly orientated fibers of weight average molecular weight of at least about 500,000, preferably at least about one million and more preferably between about two million and about five million. The tenacity of the fibers is ordinarily at least about 15 g/denier, more preferably at least about 25 g/denier and most perferably at least about 30 g/denier. Similarly, the tensile modulus of the fibers, as measured by an Instron tensile testing machine, is ordinarily at least about 300 g/denier, preferably at least about 1,000 g/denier and most preferably at least about 1,500 g/denier.

In the case of polypropylene, highly oriented polypropylene fibers of weight average molecular weight at least about 750,000, preferably at least about One million and more preferably at least about two million may be used. Since polypropylene is a much less crystalline materials than polyethylene and contains pendant methyl groups, tenacity values achievable with polypropylene are generally substantially lower than the corresponding values for polyethylene. Accordingly, a suitable tenacity is at least about 8 g/denier, with a preferred tenacity being at least 11 g/denier. The tensile modulus for polypropylene is at least about 160 g/denier, preferably at least about 200 g/denier. The melting point of the polypropylene is generally raised several degrees by the orientation process, such that the polypropylene fiber preferably has a main melting point of at least about 168° C., more preferably at least about 170° C.

Aramid fiber is formed principally from the aromatic polyamide. Aromatic polyamide fibers having a modulus of at least about 400 g/denier and tenacity of at least about 18 g/denier are useful for incorporation into composites of this invention. For Example, poly(phenylenediamine terephalamide) fibers produced commercially by Dupont Corporation under the trade name of Kevlar 29 and 49 and having moderately high moduli and tenacity values are particularly useful in forming ballistic resistant composites. (Kevlar 29 has 500 g/denier and 22 g/denier and Kevlar 49 has 1000 g/denier and 22 g/denier as values of modulus and tenacity, respectively).

In the case of polyvinyl alcohol (PV-OH), PV-OH fibers having a weight average molecular weight of at least about 100,000, preferably at least 200,000, more preferably between about 5,000,000 and about 4,000,000 and most preferably between about 1,500,000 and about 2,500,000 may be employed in the present invention. Usable fibers should have a modulus of at least about 160 g/denier, preferably at least about 200 g/denier, more preferably at least about 300 g/denier, and a tenacity of at least about 7 g/denier, preferably at least about 10 g/denier and more preferably at least about 14 g/denier and most preferably at least about 17 g/denier. PV-OH fibers having a weight average molecular weight of at least about 500,000, a tenacity of at least about 200 g/denier and a modulus of at least about 10 g/denier are particularly useful in producing ballistic resistant composites. PV-OH fibers having such properties can be produced, for example, by the process disclosed in U.S. Pat. No. 4,559,267 to Kwon et al. and commonly assigned.

In the case of polyacrylonitrile (PAN), PAN fiber of molecular weight of at least about 400,000, and preferably at least 1,000,000 may be employed. Particularly useful PAN fiber should have a tenacity to at least about 10 g/denier and an energy to break of at least about 22 joule/g. PAN fiber having a molecular weight of at least about 400,000, a tenacity of at least about 15–20 g/denier and an energy to break of at least about 22 joule/g is most useful in producing ballistic resistant articles: and such fibers are disclosed, for example, in U.S. Pat. No. 4,535,027.

The fibers may be arranged in networks having various configurations. For example, a plurality of fibers can be grouped together to form a twisted or untwisted yarn. The fibers or yarn may be formed as a felt, knitted or woven (plain, satin and crow feet weaves, etc.) into a network, fabricated into non-woven fabric, arranged in a parallel array, layered, or formed into a fabric by any of a variety of conventional techniques. Among these techniques, for ballistic resistance applications we prefer to use those variations commonly employed in the preparation of aramid fabrics for ballistic-resistant articles. For example, the techniques described in U.S. Pat. No. 4,181,768 and in M. R. Silyquist et al. J. Macromel Sci. Chem., A7(1), pp. 203 et. seq. (1973) are particularly suitable.

The fibers or fabrics may be premolded by subjecting them to heat and pressure. For extended chain polyethylene fibers, molding temperatures range from about 20°–155° C., preferably from about 80°–145° C., more preferably from about 100°–135°, and more preferably from about 100°–130° C. The pressure may range from about 10 psi to about 10,000. A pressure between about 10 psi and about 100 psi, when combined with temperatures below about 100° C. for a period of time less than about 0.5 min., may be used simply to cause adjacent fibers to stick together. Pressures from about 100 psi to about 10,000 psi, when coupled with temperatures in the range of about 150°–155° C. for a time of between about 1–5 min., may cause the fibers to deform and to compress together (generally in a film-like shape). Pressures from 100 psi to about 10,000 psi, when coupled with temperatures in the range of about 150°–155° C. for a time of between 1–5 min., may cause the film to become translucent or transparent. For polypropylene fibers, the upper limitation of the temperature range would be about 10°–20° C. higher than for extended chain polyethylene fiber.

The fibers premolded if desired may be precoated with a polymeric material preferably an elastomer which can be used to precoat the fiber prior to being arranged in a network as described above. The elastomeric material can also be used as the matrix has a tensile modulus, measured at about 23° C., of less than about 20,000, preferably less than 6,000 psi (41,400 kPa). Preferably, the tensile modulus of the elastomeric material is less than about 5,000 psi (34,500 kPa), and most preferably is less than about 2,500 (17,250 kPa) to provide even more improved performance. The glass transition temperature (Tg) of the elastomer of the elastomeric material (as evidenced by a sudden drop in the ductility and elasticity of the material) is preferably be less than about 0° C. Preferably, the Tg of the elastomer is less than about −40° C., and more preferably is less than about −50° C. The elastomer should have an elongation to break of at least about 50%. Preferably, the elongation to break is at least about 100%, and more preferably, it is about 300% for more superior preformance.

A wide variety of elastomeric materials and formulations may be utilized in this invention. Representative examples of suitable elastomers of the elastomeric material have their structures, properties, and formulations together with cross-linking procedures summarized in the Encyclopedia of Polymer Science, Volume 5, "Elastomers-Synthetic" (John Wiley and Sons Inc., 1964). For example, any of the following materials may be employed: polybutadiene, polyisoprene, natural rubber, ethylene-propylene copolymers, ethylenepropylene-diene terpolymers, polysulfide polymers, polyurethane elastomers, chlorosulfonated polyethylene, polychloroprene, plasticized polyvinylchloride using dioctyl phthalate or other plasticers well known in the art, butadiene acrylonitrile elastomers, poly(isobutylene-co-isoprene), polyacrylates, polyesters, polyethers, fluoroelastomers, silicone elastomers, thermoplastic elastomers, copolymers of ethylene.

Particularly useful elastomers are block copolymers of conjugated dienes and vinyl aromatic monomers. Butadiene and isoproprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers o the type $(AB)n(n=2-10)$ or radial configuration copolymers of the type $R-(BA)\times(x=3-150)$: wherein A is a block from a polyvinyl aromatic monomer and B is a block from a conjugated diene elastomer. Many of these polymers are produced commercially by the Shell Chemical Co. and described in the bulletin "Kraton Thermoplastic Rubber", SC-68-81.

Most preferably, the elastomeric material consists essentially of one or more of the above noted elastomers. The low modulus elastomeric material may also include fillers such as carbon black, silica, glass microballoons, etc. up to an amount not to exceed about 300% by weight of elastomer, preferably not to exceed about 100% by weight, and may be extended with oils and vulcanized by sulfur, peroxide, metal oxide, or radiation cure systems using methods well known to rubber technologists of ordinary skill. Blends of different elastomeric materials may be used together or one or more elastomeric materials may be blended with one or more thermoplastics. High density, low density, and linear low density polethylene may be cross-linked to obtain a material of appropriate properties, either alone or as blends.

The proportion of the matrix material to the fibers or fabrics may vary from 1 to 50 volume percent depending upon whether the coating material has any impact or ballistic-resistant properties of its own (which is generally not the case) and upon the rigidity, shape, heat resistance, wear resistance, flammability resistance and other properties desired. In general, ballistic-resistant articles of the present invention containing coated fibers should have a relatively minor proportion of coating 2 to 15, preferably 2 to 10 volume percent, since the ballistic-resistant properties are almost entirely attributable to the fiber. The fiber network comprises at least about 85 volume percent, more preferably at least about 90 volume percent, and most preferably at least about 95 volume percent.

The fibers can be precoated prior to being formed into the composite by the method of the present invention. The coating may be applied to the fiber in a variety of ways. One method is to apply the resin of the coating material to the stretched high modulus fibers either as a liquid, a sticky solid or particles in suspension, or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils, ketones, alcohols, aromatic solvents or hydrocarbon solvents including paraffin oil, xylene, toluene and octane. The techniques used to dissolve or disperse the coating polymers in the solvents will be those conventionally used for the coating of similar elastomeric materials on a variety of substrates.

Other techniques for applying the coating to the fibers may be used, including coating of the high modulus precursor (gel fiber) before the high temperature stretching operations, either before or after removal of the solvent from the fiber. The fiber may then be stretched at elevated temperatures to produce the coated fibers. The gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

The fibers and networks produced therefrom are formed into composite materials as the precursor or prepreg to preparing the composite articles. The term, composite, is intended to mean combinations of fiber or fabric with matrix material, which may include other materials such as fillers, lubricants or the like as noted heretofore.

A particularly effective technique for preparing a composite prepreg comprised of substantially parallel, unidirectionally aligned fibers includes the steps of pulling a fiber through a bath containing a solution of an elastomer matrix, and helically winding this fiber into a single sheet-like layer around and along the length of a suitable form, such as a cylinder. The solvent is then evaporated leaving a prepreg sheet of fiber embedded in a matrix that can be removed from the cylindrical form. Alternatively, a plurality of fibers can be simultaneously pulled through the bath of elastomer solution and laid down in closely positioned, substantially parallel relation to one another on a suitable surface. Evaporation of the solvent leaves a prepreg sheet comprised of elastomer coated fibers which are substantially parallel and aligned along a common fiber direction. The sheet is suitable to nonuniformly distribute the matrix composites and subsequently processing such as cutting, stacking and laminating to another sheet.

Composite materials may be constructed and arranged in a variety of forms. It is convenient to characterize the geometries of such composites by the geometries of the fibers and then to indicate that the matrix material may occupy part or all of the void space left by the network of fibers. One such suitable arrangement is a plurality of layers of laminates in which the coated fibers are arranged in a sheet-like array and aligned parallel to one another along a common fiber direction. Successive layers of such coated, unidirectional fibers can be rotated with respect to the previous layer. An example of such laminate structures are composites with the second, third, fourth and fifth layers rotated $+45°$, $-45°$, $90°$ and $0°$, with respect to the first layer, but not necessarily in that order. Other examples include composites with alternating layers rotated $90°$ with respect to each other.

Figure 10:
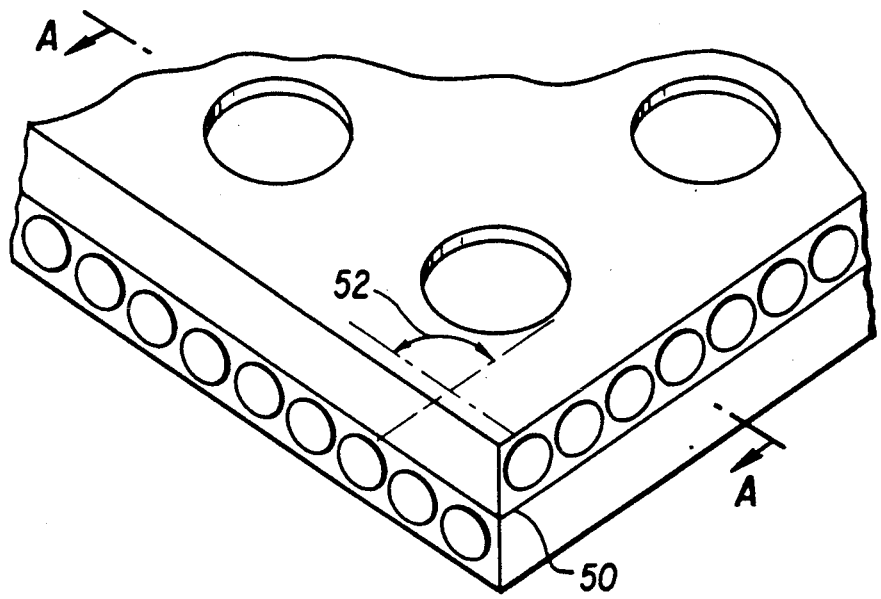
FIG. 10 is a composite made from 2 layers of the web of FIG. 3.
Figure 11:
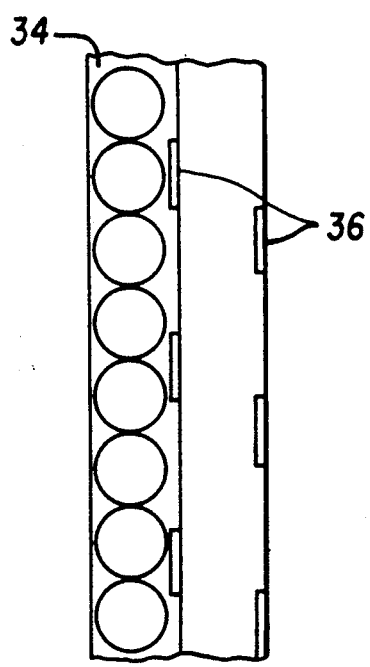
FIG. 11 is a sectional view of the composite of FIG. 10.

FIGS. 10 and 11 illustrate a composite made using the unidirectional fibrous composite layers of the present invention.

One technique for forming laminates includes the steps of arranging coated fibers into a desired network structure, and then consolidating and heat the overall structure to cause the coating material to flow and occupy the remaining void spaces, thus producing a continuous matrix. Another technique is to arrange layers or other structures of coated or uncoated fiber adjacent to and between various forms, e.g. films, of the matrix material and then to consolidate and heat set the overall structure. In the above cases, it is possible that the matrix can be caused to stick or flow without completely melting. In general, if the matrix material is only heated to a sticking point, generally more pressure is required. Also, the pressure and time to set the composite and to achieve optimal properties will generally depend on the nature of the matrix material (chemical composition as well as molecular weight) and processing temperature.

The following examples are presented to provide a more complete understanding of the invention. The specific techniques, conditions, materials, proportions and reported data set forth to illustrate the principles of the invention are exemplary and should not be construed as limiting the scope of the invention.

EXAMPLE 1

Figure 12:
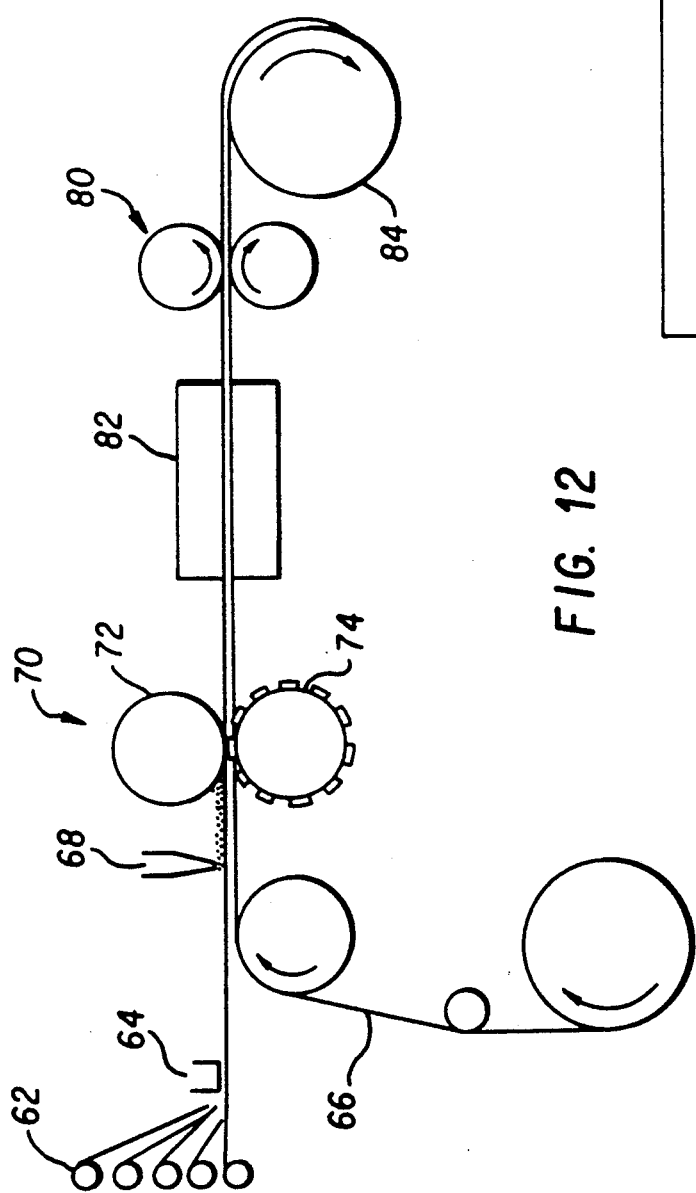
FIG. 12 is a schematic view of an equipment layout useful in the present invention.

The prepreg machine used to produce the uniaxial prepreg web composite with designed patterns is schematically shown in FIG. 12. A total of 96 yarn strands, or yarn ends of Spectra 1000 extended chain polyethylene having a reported yarn tenacity of approximately 33 g/denier, and modulus of approximately 1250 g/denier, an energy to break of approximately 55 joules/g, a yarn denier of about 650, an individual filament denier of approximately 5.5 (118 filaments per untwisted yarn), a weight average molecular weight of about $2 \times 10^6$, were pulled from creels (62) and collimated in parallel fashion by using a steel comb (64) with 1/16 inch spacing between neighboring pins. This resulted in a yarn web of 6 inch width with 16 yarn ends per inch web width. The parallel yarn web was supported by a silicone coated paper (66) of approximately 0.005 inch thick. A traverse coater (68) coated the traveling yarn web with a solution of thermoplastic Kraton D1107 styrene-isoprene-styrene block copolymer (SIS) of 5% by weight and dissolved in methylene chloride of 95% by weight. The SIS is reported to have a glass transmition temperature of $-55°$ C. a melt index of 9 g/10 min using ASTM D 1238 Condition G: and a modulus of 100 psi at 300% elongation tested according to ASTM-D462 with a jaw separation speed of 10 in/min. The yarn web was pulled at a speed of 11 feet per minute. The coating solution was pumped by a gear pump into a tube of 0.20 inch diameter at a flow rate of 60 grams/minute. The tube traversed across the yarn web in cyclic motion of approximately 50 cycles per minute.

Figure 13:
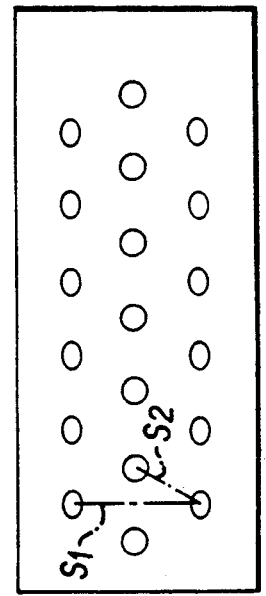
FIG. 13 is a side view of a roll useful in the present invention.

The yarn, coated with resin was then pulled through a pair of rollers (70) which defined the matrix coating pattern. The top roll (72) had a diameter of 6 inches and length of 16 inches. The bottom patterned roll (74) also had a diameter of 6 inches and length of 16 inches. The bottom roll had a circular patterned of circles of ⅜ inch diameter$\times$0.005 inch thick adhered to the roll surface. The gap between the compression rolls was 0.007 inches. FIG. 13 shows the designed pattern with circular patches, the center-to-center distance was $S_1=2$ inch and $S_2=1.5$ inch measured along axial and radial direction of the roll, respectively. The ratio of the circular patterned area to the cylindrical surface area was approximately 35%. After coating, the yarn web had a matrix pattern of "perforated plate" as shown in FIGS. 3 and 4 where the resin "rich" and "poor" areas corresponded to cylindrical surface covered without and with circular patches, respectively. The overall resin content was 5%, or, the yarn content was 95%.

The yarn web coated with matrix of "perforated plate" pattern was pulled by a pair of pull rolls (80) through an oven (82) at air temperature of 95° C. where the solvent was eliminated. Afterwards, the uniaxial prepreg tape was wound on a rewinder (84). The uniaxial prepreg web average thickness was measured to be approximately 0.002 inch thick.

EXAMPLE 2

A prepreg made according to the process of Example 1 has been examined to determine the variation of matrix content along the length of the prepreg (along reinforcing fiber direction) in a central portion of the prepreg, using infrared spectrometry. A rectangular aperture 10 mm by 7 mm was used with the 7 mm dimension being parallel to the fiber direction of the sample which allows a spacial sampling of center $\pm 3.5$ mm. The data was generated using a PERKIN ELMER 983 ratio recording dual beam dispersive infrared spectrophotometer. The region scanned was from 100 $cm^{-1}$ to 601 $cm^{-1}$ at a 3 $cm^{-1}$ resolution at 1000 $cm^{-1}$ condition. The analytical absorbances used were the 700 $cm^{-1}$ assigned to polyethylene and the 700 $cm^{-1}$ assigned to polystyrene. The absorbance ratio 700 $cm^{-1}$ /720 $cm^{-1}$ was calculated and is proportional to the ratio of the matrix to fiber in the prepreg. The variation of this ratio is shown as a function of distance along a central portion of the prepreg length in Table 1, and clearly demonstrates that matrix concentration varies regularly down the prepreg length, with the maximum concentration being approximately three times that of the minimum.

TABLE 1

| VARIATION OF ABSORBANCE RATIO ALONG PREPREG LENGTH | |
|---|---|
| CENTER OF SCANNING LOCATION (mm) | ABSORBANCE RATIO |
| 25 | 0.18 |
| 50 | 0.184 |
| 75 | 0.14 |
| 100 | 0.06 |
| 125 | 0.13 |
| 150 | 0.07 |
| 175 | 0.146 |
| 200 | 0.117 |
| 225 | 0.08 |
| 250 | 0.14 |
| 275 | 0.16 |
| 300 | 0.16 |
| 325 | 0.195 |
| 350 | 0.107 |
| 375 | 0.144 |
| 400 | 0.16 |
| 425 | 0.146 |
| 450 | 0.184 |
| 475 | 0.116 |
| 500 | 0.11 |
| 525 | 0.224 |
| 550 | 0.05 |

EXAMPLE 3

The prepreg layers of the type made in Example 1 were cut square and stacked with fiber direction perpendicular to the fiber direction of the previous layer. The stacked prepregs were placed between Apollo plates (0.05 cm thick chrome coated steel plates (0.05 cm thick chrome coated steel plates) and molded for 30 minutes in a hydraulic press having platen temperatures of 130° C. and pressure of 5.5 mPa. (800 psi). Composites were cooled in the press under pressure. Ballistic testing (Mil-Spec MIL-P-46593A(ORD)) was carried out against steel flechettes weighing 1.34 g, with pointed tip and trailing fins, 2.6 mm shaft diameter and an overall length of 35 mm. Results of ballistic testing against the steel flechettes are given in Table 2 and demonstrate that the composite constructed from patterned prepregs having 95 wt % fiber content. Comparison was made to prepregs having the indicated fiber content of 84 weight percent in Samples 2 and 3, and 69 weight percent in Sample 4. The fiber type and matrix composition were the same as in Example 1.

Usually, a composite armor has the geometrical shape of a shell or plate. The specific weight of the shells and plates can be expressed in terms of the areal density corresponds to the weight per unit area of the strucutre. In the case of fiber reinforced composites, the ballistic resistance of which depends mostly on the fiber, another useful weight characteristic is the fiber areal density of composites. This term corresponds to the weight of the fiber reinforcement per unit area of the composite.

In Table 2 "ad" is the fiber areal density which is the weight per area of a single prepreg layer: and "adt" is the total areal density of the total prepreg weight per area including the resin. AD and ADT are the corresponding values for a multi layer composite. Areal density and total areal density are reported as $kg/m^2$.

The protective power of a structure is normally expressed by citing the impacting velocity at which 50% of the projectiles are stopped, and is designated the $V_{50}$ value.

To compare structures having different $V_{50}$ values and different areal densities, the following examples state the ratios of (a) the kinetic energy (Joules) of the projectile at the $V_{50}$ velocity, to (b) the areal density of the fiber or of the composite ($kg/m^2$). These ratios are designated as the Specific Energy Absorption (SEA) and Specific Energy Absorption of Composite (SEAC), respectively.

The resin coated yarn web was extremely difficult to handle and yarn separation was observed during cutting and stacking into multi laminated layers.

What is claimed is:

1. A method of making a composite of a unidirectional fibrous web in a polymer matrix composition comprising the steps of:
   nonuniformly feeding a polymer composition into contact with a unidirectional fibrous web into a gap between two adjacent compression surfaces with at least one of the surfaces having a pattern, whereby the polymer composition is nonuniformly distributed into thick areas and thin areas as a matrix for the fibrous web in a ration of from 2 to 15 volume percent of the polymer composition and corresponding 85-98 volume percent of the fiber.

2. The method as recited in claim 1 wherein there is from 2 to 10 volume percent of the polymer compositions.

3. The method as recited in claim 2 wherein there is from 2 to 5 percent of the polymer compositions.

4. The method as recited in claim 1 wherein the patterned surface comprises a plurality of protrusions upon at least one roll, the protrusions resulting in a narrower gap between the two adjacent rollers at the location of the protrusions which are located at the gap.

5. The method as recited in claim 1 wherein the composite comprises the thick sections over a continuous area of the web.

6. The method as recited in claim 1 wherein the composite comprises the thin sections over a discontinuous area of the web.

7. The method as recited in claim 1 wherein the two adjacent compression surfaces comprise rolls, both of which have a patterned surface.

8. The method as recited in claim 1 wherein the matrix composition is distributed so that the ratio of polymer to fiber in the thick areas is at least 1.5 times greater than the ratio of polymer to fiber in the thin areas.

9. The method as recited in claim 4 wherein the pro-

TABLE 2

| BALLISTIC PERFORMANCE OF BALLISTIC COMPOSITES AGAINST FLECHETTES | | | | | | | |
|---|---|---|---|---|---|---|---|
| Sample | | Prepreg | | Target | | V50 | | |
| No. | Type | ad | adt | AD | ADT | (ft./S) | SEA | SEAC |
| (A) 95 wt % Fiber | | | | | | | | |
| 1 | Pattern | 0.04517 | 0.04755 | 6.68 | 7.0 | 1248 | 14.5 | 13.9 |
| (B) 84 wt % Fiber | | | | | | | | |
| 2 | Standard | 0.03507 | 0.04175 | 4.21 | 5.01 | 655 | 6.35 | 5.34 |
| 3 | Standard | 0.03507 | 0.04175 | 7.56 | 9.0 | 833 | 5.27 | 4.80 |
| (C) 69 wt % Fiber | | | | | | | | |
| 4 | Standard | 0.0431 | 0.06241 | 6.37 | 9.25 | 853 | 7.12 | 4.90 |

All areal densities are reported in the usual units of $kg/m^2$
Sea and seat are in units of $J \cdot m^2/kg$

COMPARATIVE EXAMPLE 1

Example 1 was repeated with the exception that the circular patches were taken off from the roll surface and the gap between the compression rolls were reduced to 0.006 inch approximately in order to produce resin coated yarn web of approximately 95% yarn content.

trusions comprise from 10 to 90 percent of the area of at least one roll.

10. The method as recited in claim 9 wherein the protrusions comprise 50 to 90 percent of the area of at least one roll.

* * * * *